(12) United States Patent
Line et al.

(10) Patent No.: US 8,882,197 B2
(45) Date of Patent: Nov. 11, 2014

(54) ULTRA FLEX AND FOLD SEAT WITH INGRESS/EGRESS FEATURE

(75) Inventors: Johnathan Andrew Line, Northville, MI (US); Dumitru Dan Nae, Troy, MI (US); Steven McInally, Northville, MI (US); Ammeswara Rao Sajja, Canton, MI (US); Curtis D. Stanhope, Pinckney, MI (US); Gornique'Ka Mo'Nya Heath, Taylor, MI (US); Daniel Ferretti, Commerce Township, MI (US); Kurt Kormos, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 13/597,041

(22) Filed: Aug. 28, 2012

(65) Prior Publication Data
US 2014/0062158 A1    Mar. 6, 2014

(51) Int. Cl.
*B60N 2/10*    (2006.01)
(52) U.S. Cl.
USPC ...................... 297/334; 297/331; 297/378.12
(58) Field of Classification Search
USPC .................................. 297/324, 331, 334, 335
See application file for complete search history.

(56) References Cited

U.S. PATENT DOCUMENTS

| | | | |
|---|---|---|---|
| 5,941,602 A | 8/1999 | Sturt et al. | |
| 6,767,063 B1 * | 7/2004 | Abdella et al. | 297/378.12 |
| 6,863,330 B2 * | 3/2005 | Yokoyama et al. | 296/65.03 |
| 6,935,691 B1 * | 8/2005 | Sasaki et al. | 297/344.1 |
| 7,350,867 B2 * | 4/2008 | Park | 297/378.12 |
| 2009/0256379 A1 * | 10/2009 | Yamada et al. | 296/65.08 |
| 2010/0308619 A1 | 12/2010 | Hoge et al. | |

* cited by examiner

*Primary Examiner* — David R Dunn
*Assistant Examiner* — Jody Giacoman
(74) *Attorney, Agent, or Firm* — Vichit Chea; Price Heneveld LLP

(57) ABSTRACT

A vehicle seating assembly includes a track assembly having a rail and a base member slidably engaged with the rail and supporting a seatback. A bracket is coupled to the rail and supports a seat with an articulation feature. A linkage couples the seat with the seatback. A coupler is engaged with the articulation feature. Movement of the coupler relative to the articulation feature translates the seating assembly between a deployed position, wherein the seat is generally orthogonal to the seatback, and a stowed position, wherein the seatback abuts the seat and is generally parallel to the rail. A hinge in the linkage causes translation from the deployed position to an access position. The seat is generally orthogonal to the rail and the seatback is slid to a forward segment of the rail.

18 Claims, 11 Drawing Sheets

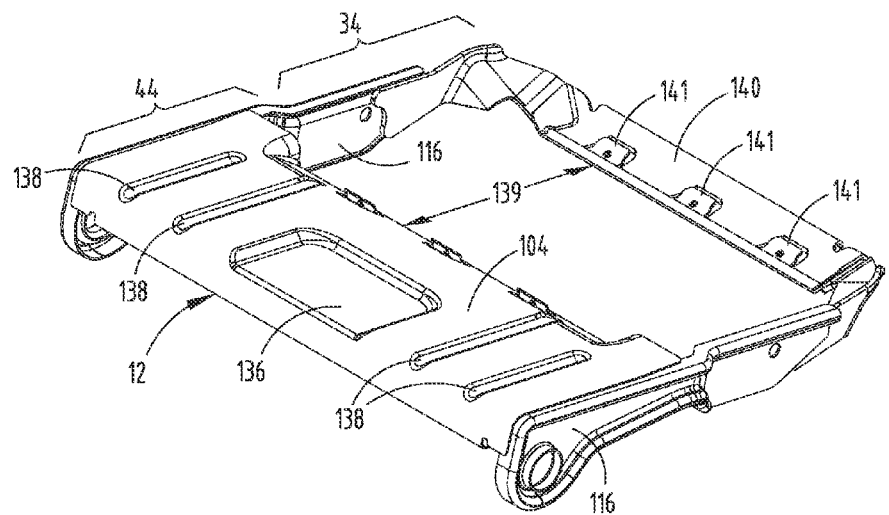
FIG. 4
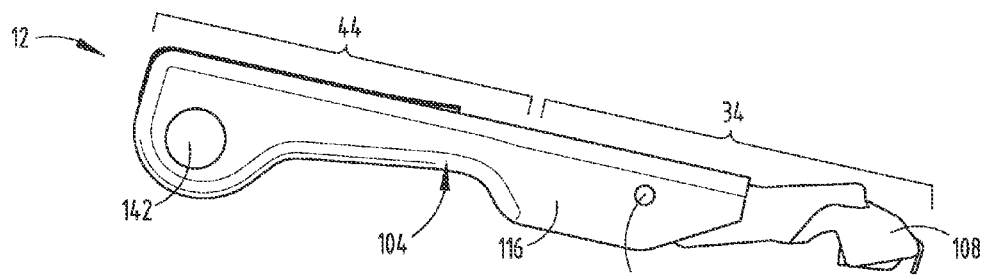
FIG. 4A
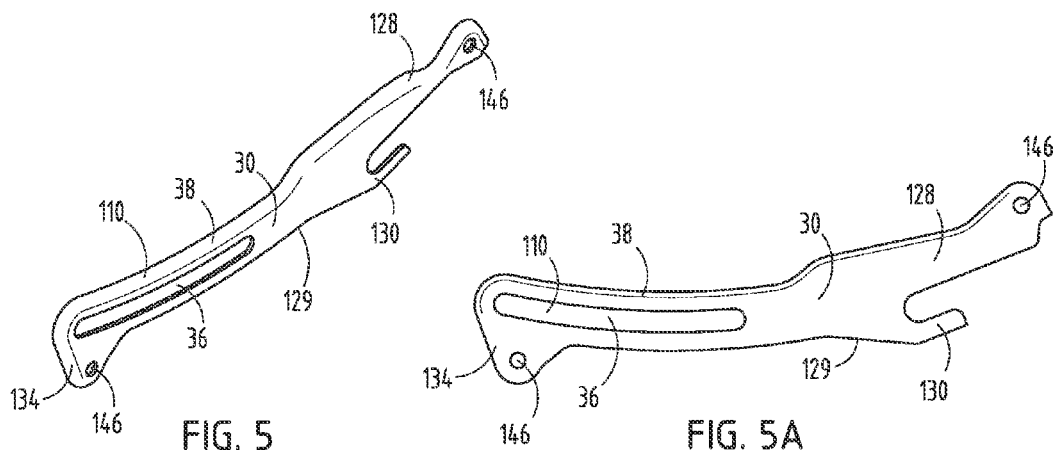
FIG. 5
FIG. 5A

ULTRA FLEX AND FOLD SEAT WITH INGRESS/EGRESS FEATURE

FIELD OF THE INVENTION

The present invention generally relates to a vehicle seating assembly, and more particularly to a vehicle seating assembly with an ultra flex and fold seat with an ingress/egress feature.

BACKGROUND OF THE INVENTION

Vehicle seating features that provide for increased vehicle storage capacity and rear seat accessibility are beneficial for a variety of reasons, including allowing vehicle sizes to be reduced while maintaining interior vehicle storage and seating capacity. Vehicle seating assemblies are configured to fold and collapse to a variety of configurations.

SUMMARY OF THE INVENTION

According to one aspect of the present invention, a vehicle seating assembly includes a track assembly having a rail and a base member slidably engaged with the rail and supporting a seatback. A bracket is coupled to the rail and supports a seat with an articulation feature. A linkage couples the seat with the seatback. A coupler is engaged with the articulation feature. Movement of the coupler relative to the articulation feature translates the seating assembly between a deployed position, wherein the seat is generally orthogonal to the seatback, and a stowed position, wherein the seatback abuts the seat and is generally parallel to the rail. A hinge in the linkage causes translation from the deployed position to an access position. The seat is generally orthogonal to the rail and the seatback is slid to a forward segment of the rail.

According to another aspect of the present invention, a vehicle seating assembly includes a seatback slidably engaged with a rail. A bracket is coupled to the rail and supports a seat. A linkage couples the seat with the seatback. An intermediate portion is slidably engaged with a mid-portion of the bracket to cause translation of the seating assembly between a deployed position, wherein the seat is generally parallel to the rail, and a stowed position, wherein the seatback is generally parallel to the rail. A hinge in the linkage causes translation from the deployed position to an access position. The seat is generally orthogonal to the rail.

According to yet another aspect of the present invention, a vehicle seating assembly includes a bracket coupled to a rail, supporting a seat, and has an articulation feature. A linkage couples the seat with a seatback. A coupler is engaged with the articulation feature. Movement of the coupler relative to the articulation feature translates the seating assembly between deployed and stowed positions. A hinge in the linkage causes translation from the deployed position to an access position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a top perspective view of a seat of the vehicle seating assembly;

FIG. 4A is a side elevational view of the seat of FIG. 4;

FIG. 5 is a top perspective view of a bracket of a vehicle seating assembly;

FIG. 5A is a side elevational view of the bracket of FIG. 5;

DETAILED DESCRIPTION OF THE EMBODIMENTS

Figure 1:
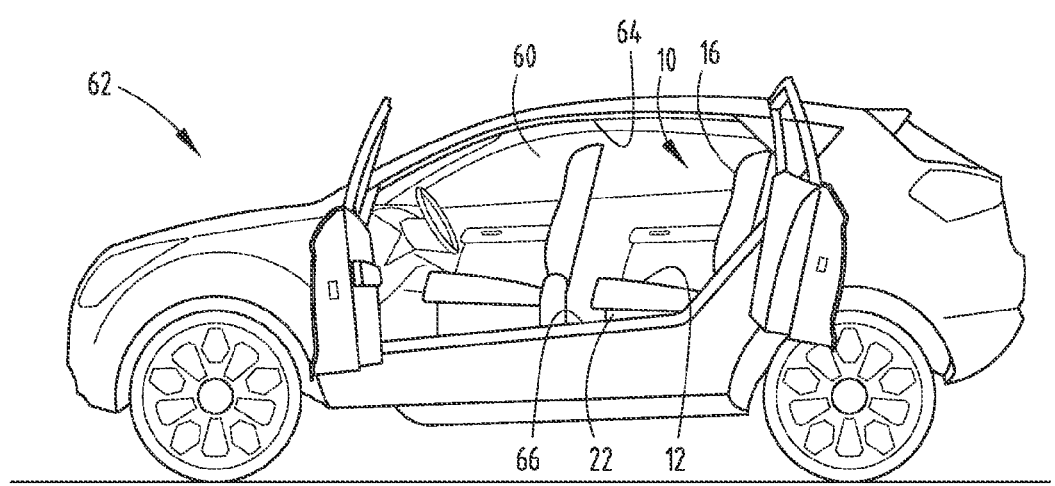
FIG. 1 is a side perspective view of one embodiment of a vehicle seating assembly of the present invention in a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-13, reference numeral 10 generally designates a vehicle seating assembly including a seat 12 having a sitting surface 14. A seatback 16 includes a back support surface 18. A tab 20 extends forward from the seatback 16. A track assembly 22 includes a rail 24 and a base member 26 slidably engaged with a rearward segment 28 of the rail 24 and pivotally supporting the seatback 16. A bracket 30 is pivotally coupled with a forward segment 32 of the rail 24 and a rear portion 34 of the seat 12 and includes an articulation feature 36 disposed at a mid-portion 38 of the bracket 30. A linkage 40 includes a fore end 42 pivotally coupled with a front portion 44 of the seat 12, an aft end 46 pivotally coupled with the tab 20, and a coupler 48 disposed at an intermediate portion 50 of the linkage 40 and engaged with the articulation feature 36. Movement of the coupler 48 relative to the articulation feature 36 causes translation of the vehicle seating assembly 10 between a deployed position 52 and a stowed position 54. In the deployed position 52, a planar extent of the seat 12 is generally parallel with the track assembly 22 and generally orthogonal to a planar extent of the seatback 16. In the stowed position 54, the planar extent of the seatback 16 is generally parallel with the track assembly 22 and the sitting surface 14 of the seat 12 abuts the back support surface 18 of the seatback 16. A hinge 56 is disposed in the linkage 40 between the coupler 48 and the aft end 46. Rotation of the hinge 56 causes translation of the vehicle seating assembly 10 between the deployed position 52 and an access position 58. In the access position 58, the planar extent of the seat 12 is generally orthogonal relative to the track assembly 22 and the seatback 16 slides to the forward segment 32 of the rail 24.

As illustrated in the embodiment of FIG. 1, the vehicle seating assembly 10 is positioned within an interior 60 of a vehicle 62. It is contemplated that the vehicle seating assembly 10 may be positioned at various seat locations within the interior 60 of the vehicle 62, including a second row seat location, a front seat location, and other conceivable vehicle occupant seat locations. The interior 60 of the vehicle 62 is generally defined between a ceiling 64 and a floor 66 of the vehicle 62. The floor 66 of the vehicle 62 extends within the interior 60 of the vehicle 62. The vehicle seating assembly 10 is supported by and attached to the floor 66. More specifically, the vehicle seating assembly 10 is coupled with the floor 66 of the vehicle 62 about the track assembly 22.

Figure 2:
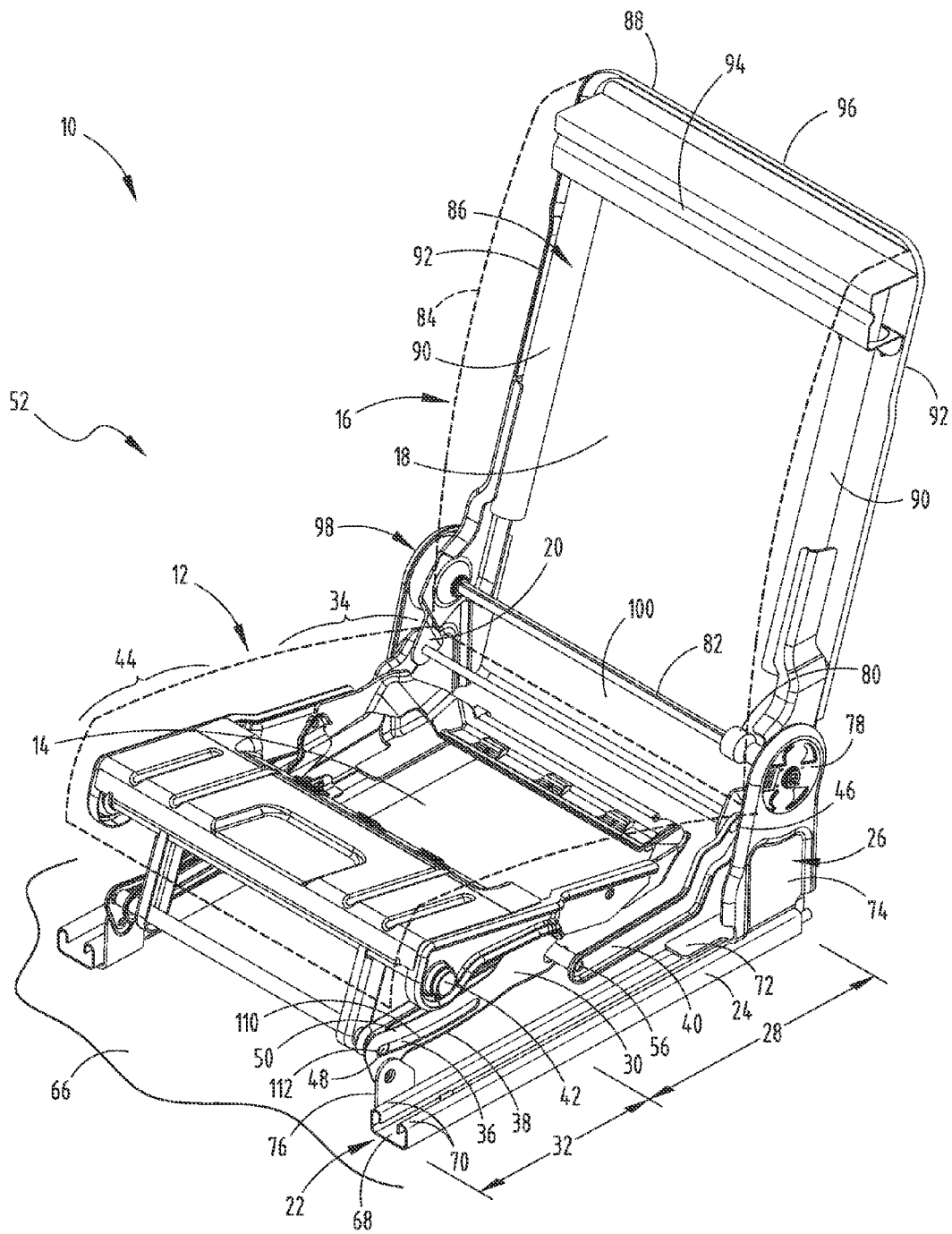
FIG. 2 is a top perspective view of a vehicle seating assembly of the present invention.

As shown in FIG. 2, the rail 24 of the track assembly 22 is coupled with the floor 66 of the vehicle 62 (FIG. 1). The base member 26 of the track assembly 22 is slidably engaged with and supported by the rail 24, allowing the base member 26 to horizontally translate along the rail 24 relative to the floor 66 of the vehicle 62. The rail 24 includes a channel 68 formed along the rail 24 between inwardly facing retention edges 70 that extend along the length of the rail 24. The retention edges 70 slidably contain the base member 26 within the channel 68 and prevent vertical movement or vertical detachment of the base member 26 with the rail 24. The base member 26 extends upwardly from the channel 68 at the rearward segment 28 of the rail 24. The base member 26 includes a slider 72 that slidably engages the rail 24 and a rear support 74 that extends upwardly to support and pivotally couple with the seatback 16. At the forward segment 32 of the rail 24, a support flange 76 is operably coupled with and vertically protruding from the inside retention edge 70 of the rail 24. The support flange 76 pivotally couples with the bracket 30 to support the seat 12. It is also contemplated that the support flange 76 may be integrally formed with the rail 24.

As further illustrated in FIG. 2, the seatback 16 includes a recliner pivot 78 that pivotally couples the seatback 16 with the base member 26. The recliner pivot 78 is configured to lock the angle of the seatback 16 relative to a planar extent of the seat 12. More specifically, the seatback 16 is pivotally supported by the rear support 74 of the base member 26 about the recliner pivot 78. The recliner pivot 78 includes an actuating device 80 that operates to lock the angle of the planar extent of the seatback 16 relative to the planar extent of the seat 12. The recliner pivot 78 also includes a torsion bar 82 that extends between a corresponding rear support 74 on an opposing side 98 of the vehicle seating assembly 10 that is similarly engaged with a corresponding track assembly 22. It is contemplated that a single track assembly or multiple track assemblies may be used to support the vehicle seating assembly 10. Additionally, as described and illustrated herein, several elements and assemblies may be formed of two or more substantially identical or mirrored corresponding elements or assemblies. To this end, like reference numerals have been used to illustrate like components of the vehicle seating assembly 10.

The seatback 16, as shown in FIG. 2, includes a back cushion 84 disposed over a back frame 86. The back support surface 18 of the seatback 16 is defined by a forward facing surface of the back cushion 84. A rear panel 88 of the seatback 16 is substantially planar and is defined by a rearward facing surface of the seatback 16, which is generally aligned with the back cushion 84. When the vehicle seating assembly 10 is in the deployed position 52, as shown in FIG. 2, the rear panel 88 of the seatback 16 is generally orthogonal to a planar extent of the seat 12. The back frame 86 includes a side beam 90 vertically extending from the recliner pivot 78 along a side edge 92 of the rear panel 88 and coupling with a top beam 94 orthogonally extending therefrom across a top edge 96 of the rear panel 88. A corresponding side beam 90 extends along the opposing side 98 of the vehicle seating assembly 10, to form the substantially U-shaped back frame 86. The seatback 16 includes the forwardly extending tab 20 that is pivotally coupled with the linkage 40, such that the tab 20 extends from the side beam 90 of the back frame 86 below a base portion 100 of the seatback 16 that couples with the recliner pivot 78 and the rear support 74 of the base member 26.

Referring again to FIG. 2, the seat 12 includes a seat cushion 102 (FIG. 9) disposed over a seat pan 104 (FIG. 4). The sitting surface 14 of the seat 12 is defined by an upward facing surface of the seat cushion 102. The rear portion 34 of the seat 12 includes a crease formed by the seat cushion 102 abutting the back cushion 84 at the base portion 100 of the seatback 16. The rear portion 34 of the seat 12 is supported by a hook 108 (FIG. 3A) that extends from the rear portion 34 of the seat 12 and engages a protuberance laterally extending inward from the rear support 74 of the base member 26. The hook 108 (FIG. 3A) provides vertical support to the rear portion 34 of the seat 12 when the vehicle seating assembly 10 is in the deployed position 52, as the hook 108 (FIG. 3A) is engaged with the protuberance in the deployed position 52.

As further shown in FIG. 2, the front portion 44 of the seat 12 is supported by the support flange 76 of the rail 24, which is coupled with the seat 12 by the bracket 30 and the linkage 40. The linkage 40 extends between the front portion 44 of the seat 12 at the fore end 42 of the linkage 40 and the tab 20 at the aft end 46 of the linkage 40, thereby coupling the seat 12 with the seatback 16. The coupler 48 is disposed at the intermediate portion 50 of the linkage 40 and is slidably engaged with the articulation feature 36 on the mid-portion 38 of the bracket 30. In one embodiment, the articulation feature 36 of the bracket 30 includes an elongated slot 110 disposed at the mid-portion 38 thereof. Further, the coupler 48 of the linkage 40 includes a protrusion 112 disposed at the intermediate portion 50 thereof, such that the protrusion 112 is slidably engaged with the elongated slot 110. The bracket 30 extends between the support flange 76 of the rail 24 and the rear portion 34 of the seat 12. It is also contemplated that the articulation feature 36 of the bracket 30 could alternatively include a protrusion and the coupler 48 of the linkage 40 could include an elongated slot, such that the mid-portion 38 of the bracket 30 may slidably engage the intermediate portion 50 of the linkage 40.

Figure 3:
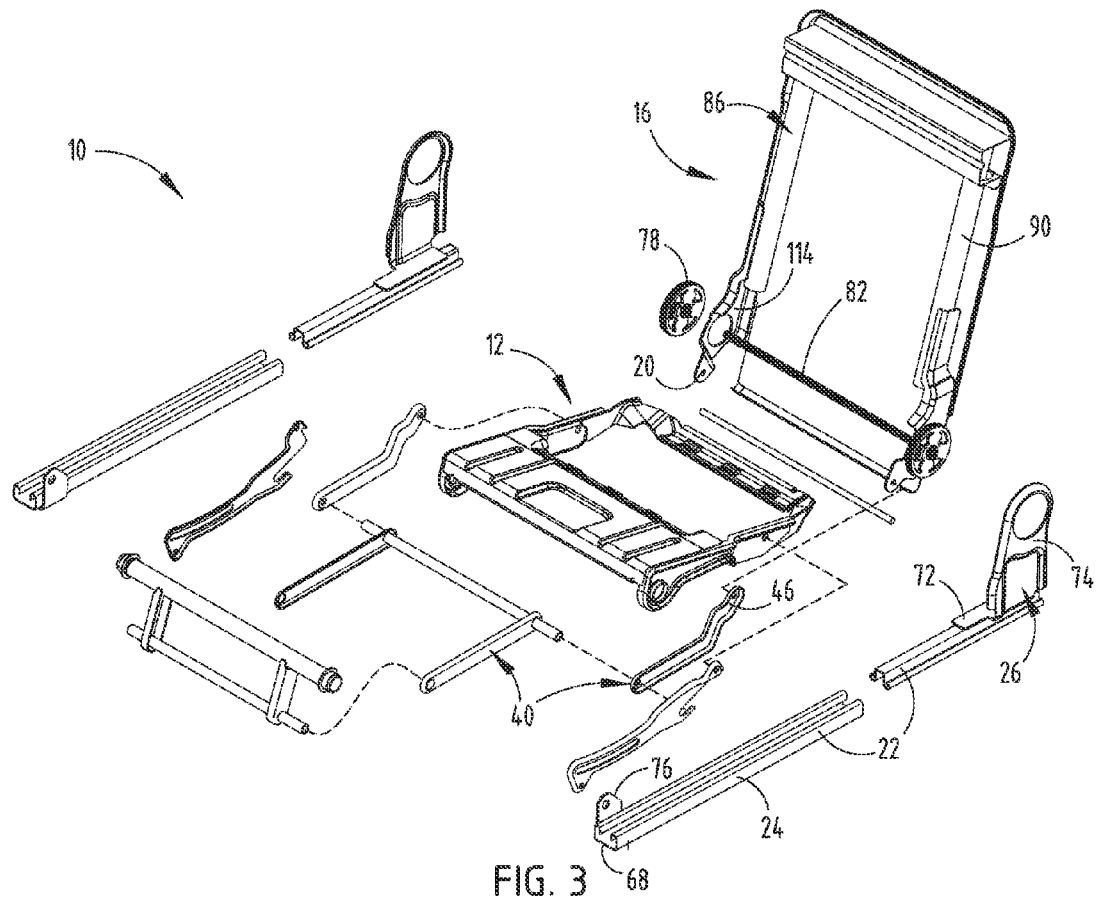
FIG. 3 is a top perspective exploded view of a vehicle seating assembly of the present invention.

Referring now to FIG. 3, the side beam 90 of the back frame 86 includes a recliner pivot receiver 114 extending substantially orthogonal to the rear panel 88 (FIG. 2) at the base portion 100 of the seatback 16. The recliner pivot receiver 114 is aligned with and couples with the recliner pivot 78. The torsion bar 82 extends between the corresponding recliner pivot receivers 114 and the corresponding recliner pivots 78. The tab 20 extends down and forward from the recliner pivot receiver 114 of the back frame 86. The aft end 46 of the linkage 40 pivotally couples with the tab 20. The back frame 86 couples with the recliner pivot 78, which in turn couples with the rear support 74 of the base member 26. The rail 24 of the track assembly 22 slidably engages and supports the base member 26, and therefore, slidable movement of the slider 72 of the base member 26 along the channel 68 of the rail 24 alters the horizontal orientation of the seatback 16 relative to the rail 24 and the floor 66 of the vehicle 62 (FIG. 1). However, the support flange 76 is fixedly coupled with the rail 24, such that the horizontal orientation of the seat 12 may not be altered with the track assembly 22 of the present invention. Accordingly, it is contemplated that the support flange 76 may also be slidably coupled with the rail 24 or that an additional track assembly 22 may be adapted to the vehicle seating assembly 10 to provide forward and rearward adjustment of the horizontal orientation of the vehicle seating assembly 10.

Figure 3A:
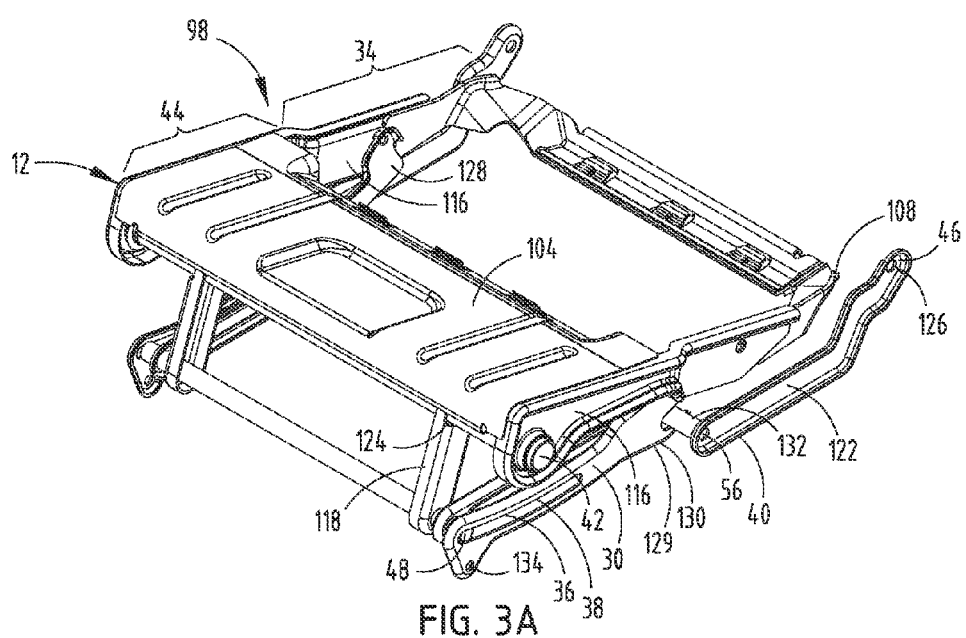
FIG. 3A is a top perspective view of a seat, a bracket, and a linkage of the vehicle seating assembly.

Referring now to FIG. 3A, the seat pan 104 of the seat 12 includes side flanges 116 orthogonally extending down along opposing edges of the seat pan 104. The hook 108 that extends from the rear portion 34 of seat 12 is in alignment and is an extension of the side flange 116. The side flange 116 couples with the bracket 30 and the fore end 42 of the linkage 40. The linkage 40 includes a front link 118, an intermediate link 120 (FIG. 6A), and a rear link 122, wherein a top end 124 of the front link 118 pivotally couples with the side flange 116 at the front portion 44 of the seat 12. A rear end 126 of the rear link 122 pivotally couples with the tab 20 (FIG. 3). The coupler 48 is disposed at the pivotable connection of the front link 118 and the intermediate link 120 and slidably engages the articulation feature 36 disposed at the mid-portion 38 of the bracket 30. The hinge 56 is disposed at the pivotable connection of the intermediate link 120 and the rear link 122. The fore end 42 and the aft end 46 of the linkage 40 correlates with the top end 124 of the front link 118 and the rear end 126 of the rear link 122, respectively.

Referring again to FIG. 3A, the bracket 30 is coupled with the side flange 116 at the rear portion 34 of the seat 12, between the connections of the front link 118 of the linkage 40 with the side flange 116 and the tab 20 (FIG. 3) with the rear link 122. More specifically, a rear engagement portion 128 of the bracket 30 is pivotally coupled with the side flange 116. A floor facing side 129 of the rear engagement portion 128 of the bracket 30 has a fork 130 extending therefrom that engages a rear engagement rod 132 extending laterally from the hinge 56 when the vehicle seating assembly 10 is in the deployed and access positions 52, 58 (FIG. 12), the function of which will be described in more detail below. The mid-portion 38 of the bracket 30 extends forward from the rear engagement portion 128 and a forward slide connector 134 of the bracket 30 extends from the mid-portion 38 of the bracket 30 to pivotally couple with the support flange 76 of the rail 24 (FIG. 3). The corresponding linkage 40 and the bracket 30 are positioned and similarly engaged with the opposing side 98 of the vehicle seating assembly 10.

As illustrated in FIG. 4, the front portion 44 of the seat 12 includes a front cushion support 136 extending between the side flanges 116. The front cushion support 136 includes a top surface with grooves 138 formed horizontally in the fore-aft direction thereon. At the rear portion 34 of the seat 12, a rear cushion support 140 extends between the side flanges 116. A plurality of engagement members 141 extend upwardly from the rear cushion support 140. A space 139 is provided between the front cushion support 136 and the rear cushion support 140, allowing the seat cushion 102 (FIG. 2) to flex and compress into the space 139. The front and rear cushion supports 136, 140 are adapted to engage and secure the seat cushion 102 (FIG. 2) to the seat pan 104.

Referring now to FIG. 4A, the side flange 116 of the seat pan 104 extends from the front portion 44 to the rear portion 34 of the seat 12. A front hole 142 is formed in the front portion 44 of the seat 12 on the side flange 116 to engage the top end 124 of the front link 118 of the linkage 40 (FIG. 3A). Likewise, a rear hole 144 is formed in the rear portion 34 of the seat 12 on the side flange 116 to engage the rear engagement portion 128 of the bracket 30 (FIG. 3A). The hook 108 extends rearwardly from the rear hole 144 on the seat pan 104. The hook 108 is positioned to face down, allowing the hook 108 to engage the protuberance laterally extending inward from the rear support 74 of the base member 26 (FIG. 3).

One embodiment of the bracket 30, as illustrated in FIGS. 5 and 5A, includes the arcuate mid-portion 38 that has the articulation feature 36 thereon. In the illustrated embodiment, the articulation feature 36 at the mid-portion 38 of the bracket 30 includes the arcuate elongated slot 110, which is formed in the bracket 30. The rear engagement portion 128 of the bracket 30 extends upward at a slight angle from the mid-portion 38. As illustrated, the rear engagement portion 128 includes the fork 130 extending down from the floor facing side 129 of the rear engagement portion 128. The forward slide connector 134 of the bracket 30 extends downward generally orthogonally from the mid-portion 38 of the bracket 30 at an opposite end thereof from the rear engagement portion 128. Accordingly, a longitudinal extent of the entire bracket 30 is generally non-linear. Connection apertures 146 are formed at the opposing ends of the bracket 30, such that one connection aperture 146 is formed in the forward slide connector 134 and one connection aperture 146 is formed in a distal end of the rear engagement portion 128.

Figure 6:
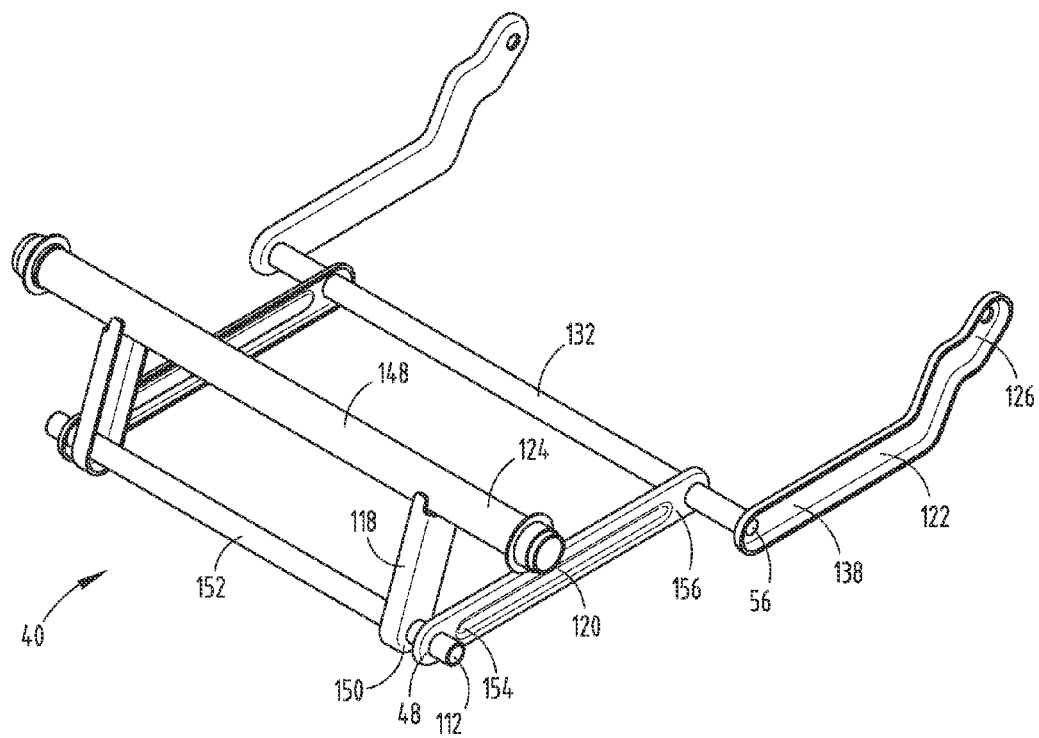
FIG. 6 is a top perspective view of a linkage of a vehicle seating assembly.

The linkage 40, as shown in FIG. 6, includes the front link 118, the intermediate link 120, and the rear link 122 pivotally coupled in series, respectively. The top end 124 of the front link 118 includes a top engagement rod 148 extending between the corresponding top ends 124 of the front links 118. Similarly, a bottom end 150 of the front link 118 includes a bottom engagement rod 152 extending between the corresponding bottom ends 150, such that the bottom end 150 of the front link 118 pivotally couples with a first end 154 of the intermediate link 120 about the bottom engagement rod 152. Further, the bottom engagement rod 152 extends outward laterally beyond the intermediate link 120 to define the protrusion 112 of the coupler 48 that engages the elongated slot 110 of the articulation feature 36 (FIG. 5). A second end 156 of the intermediate link 120 pivotally couples with a front end 158 (FIG. 11) of the rear link 122. The rear engagement rod 132 extends between corresponding second ends 156 of the intermediate links 120 and extends laterally to couple with the front end 158 of the rear links 122. The pivotable connection about the rear engagement rod 132 defines the hinge 56 disposed in the linkage 40. The rear end 126 of the rear link 122 pivotally couples with the tab 20 of the seatback 16 (FIG. 3).

Figure 6A:
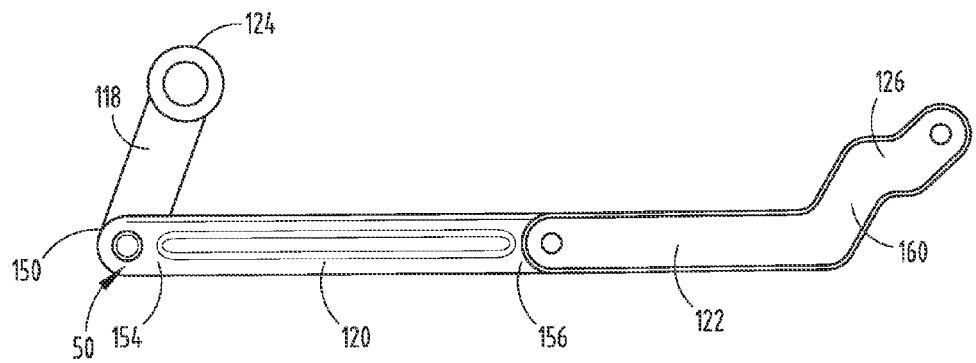
FIG. 6A is a side elevational view of the linkage of FIG. 6.

As illustrated in FIG. 6A, the generally linear front link 118 is pivotally coupled with the generally linear intermediate link 120. As such, a longitudinal extent of the front link 118 is generally linear, whereby the top end 124 of the front link 118 extends linearly from the bottom end 150 of the front link 118. Likewise, the first end 154 of the intermediate link 120 extends linearly from the second end 156 of the intermediate link 120. The intermediate portion 50 of the linkage 40 corresponds with the intermediate link 120 and the connection of the intermediate link 120 with the front link 118. The rear link 122 is substantially non-linear, having a back member 160 extending upward at the rear end 126 of the rear link 122. Connection holes are formed at the top end 124 of the front link 118 and the rear end 126 of the rear link 122. It is also contemplated that various alterations of the shape and connection points of the front link 118, intermediate link 120, and rear link 122 may be made to accomplish the similar function of the linkage 40, as described in more detail below.

Figure 7:
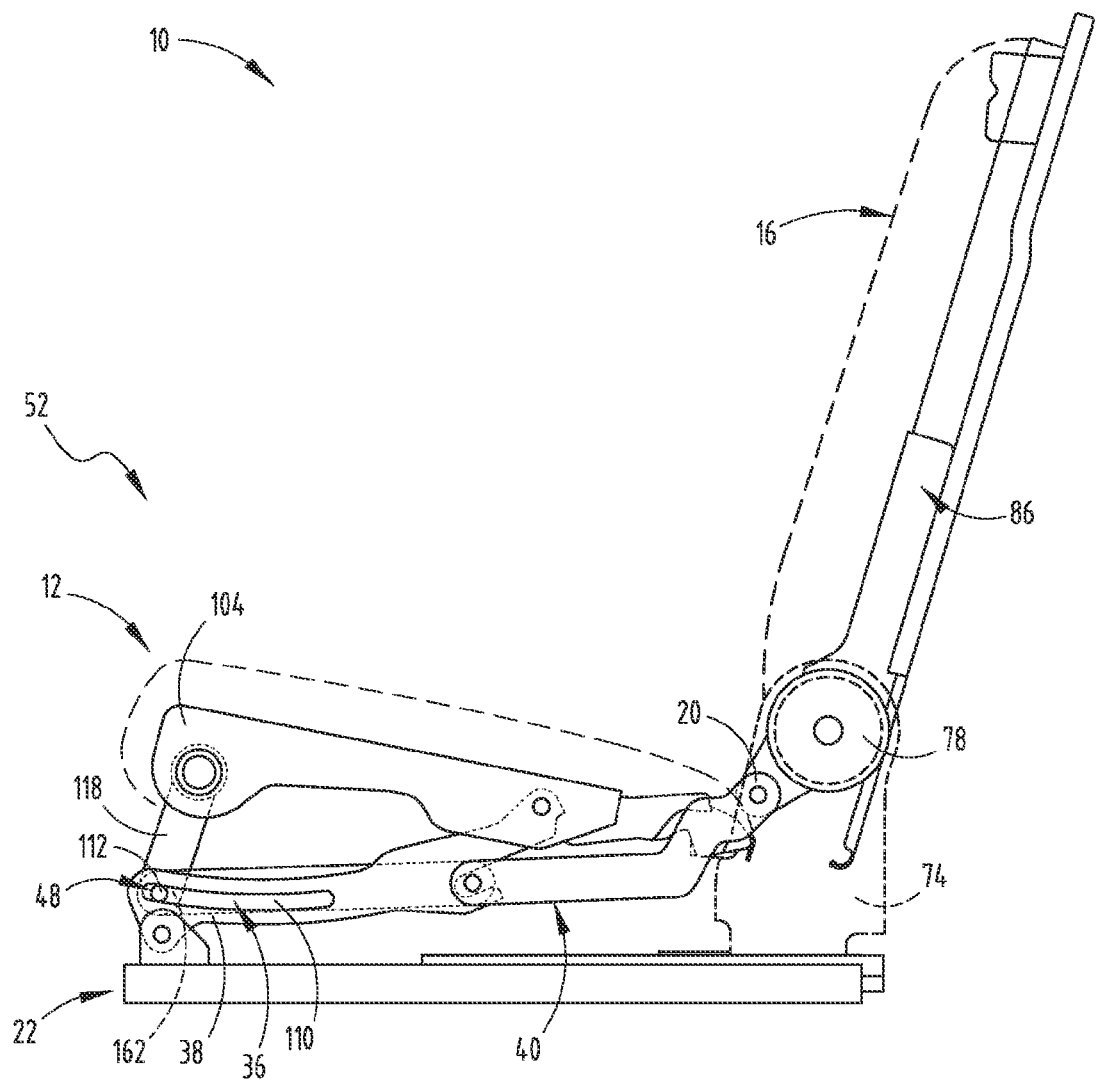
FIG. 7 is a side elevational view of a vehicle seating assembly in a deployed position.

Referring now to FIG. 7, the vehicle seating assembly 10 is illustrated in the deployed position 52. In the deployed position 52, the protrusion 112 of the coupler 48 of the linkage 40 is engaged with a forward portion 162 of the elongated slot 110 of the articulation feature 36 that is disposed along the mid-portion 38 of the bracket 30. Similarly in this position, the front link 118 of the linkage 40 is positioned generally orthogonal to the seat pan 104 and a longitudinal extent of the intermediate link 120 of the linkage 40. Further, the front link 118 is generally parallel to a longitudinal extent of the seatback 16. Accordingly, a planar extent of the seat 12 is generally parallel with the track assembly 22 and generally orthogonal to a planar extent of the seatback 16. In addition, in this position, the tab 20 extends forward from the rear support 74 and the back frame 86 of the seatback 16. It is contemplated that the seatback 16 may be reclined back about the recliner pivot 78 while the vehicle seating assembly 10 is in the deployed position 52, thereby altering the position of the seatback 16 relative to the seat 12. However, the deployed position 52 of the vehicle seating assembly 10, as illustrated, is described herein. Other relative configurations and orientations of elements of the vehicle seating assembly 10 in the deployed position 52 may be readily appreciated from FIGS. 1-7.

Figure 8:
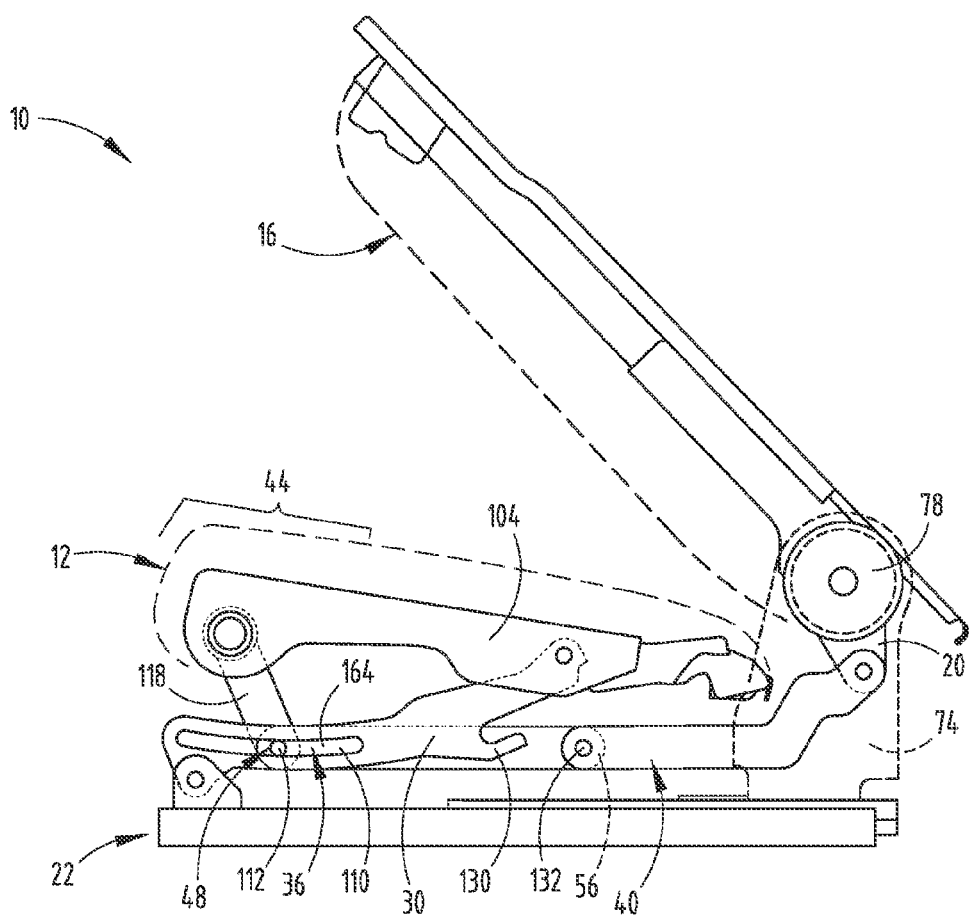
FIG. 8 is a side elevational view of a vehicle seating assembly transitioning between the deployed position and a stowed position.
Figure 9:
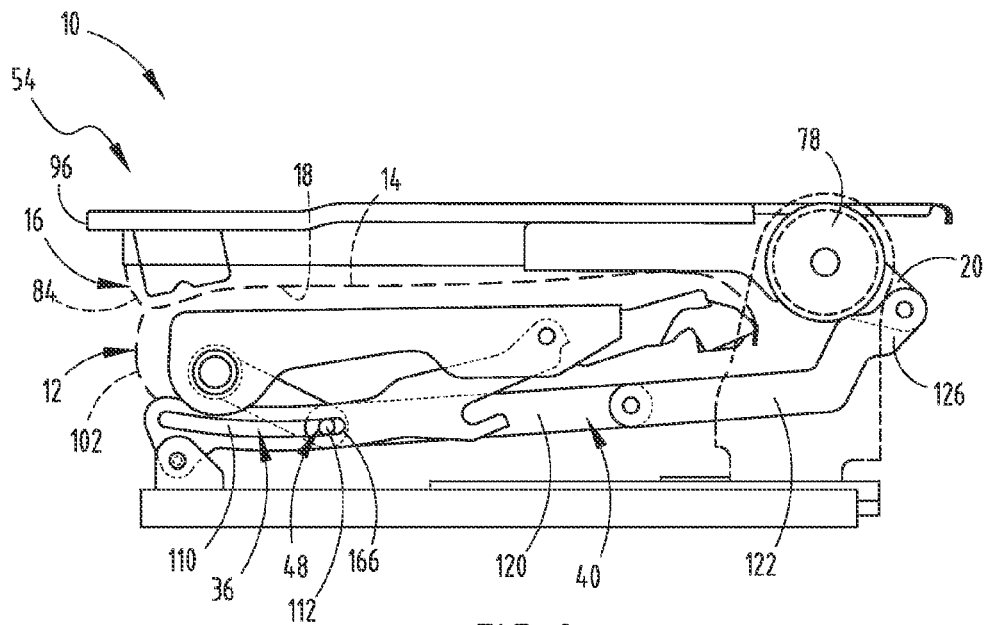
FIG. 9 is a side elevational view of a vehicle seating assembly in the stowed position.

As shown in FIG. 8, the vehicle seating assembly 10 is transitioning between the deployed position 52 (FIG. 7) and the stowed position 54 (FIG. 9). During the transition to the stowed position 54 (FIG. 9), the seatback 16 pivots forward about the recliner pivot 78 to angle forward, causing the tab 20 to rotate about the recliner pivot 78 and move counter-clockwise, in the rearward direction. The tab 20 moving in the rearward direction, as illustrated, causes the linkage 40 to likewise move in the rearward direction, which results in the protrusion 112 of the coupler 48 to slide rearward in the elongated slot 110 of the articulation feature 36. As a result of the protrusion 112 sliding rearward to a mid-portion 164 of the elongated slot 110, the front link 118 of the linkage 40 begins to angle forward, similar to the repositioned orientation of the seatback 16. Also as a result of the protrusion 112 sliding rearward along the elongated slot 110, the rear engagement rod 132 of the hinge 56 detaches from the fork 130 in the bracket 30. The front portion 44 of the seat 12 and the seat pan 104 begin to lower toward the track assembly 22 and the floor 66 of the vehicle 62 (FIG. 1). As the seatback 16 continues to fold down in the forward direction, the protrusion 112 of the coupler 48 continues to slide rearward along the mid-portion 164 of the elongated slot 110.

Referring now to FIG. 9, the vehicle seating assembly 10 is illustrated in the stowed position 54. In the stowed position 54, the sitting surface 14 of the seat 12 and the back support surface 18 of the seatback 16 are in abutting contact. Likewise, the planar extent of the seat 12 and the planar extent of the seatback 16 are substantially parallel to the longitudinal extent of the intermediate link 120 of the linkage 40. The counter-clockwise rotation of the tab 20 about the recliner pivot 78 repositions the rear end 126 of the rear link 122 below the recliner pivot 78 and slides the protrusion 112 of the coupler 48 to a rearward portion 166 of the elongated slot 110 of the articulation feature 36. By the tab 20 drawing the linkage 40 in the rearward direction, the tab 20 is rotated to a position behind the recliner pivot 78 and the seatback 16. However, it is contemplated that using a thicker or thinner seat cushion 102 or back cushion 84 may result in the orientation of the seat 12 and the seatback 16 being altered slightly from the orientations described above.

Figure 10:
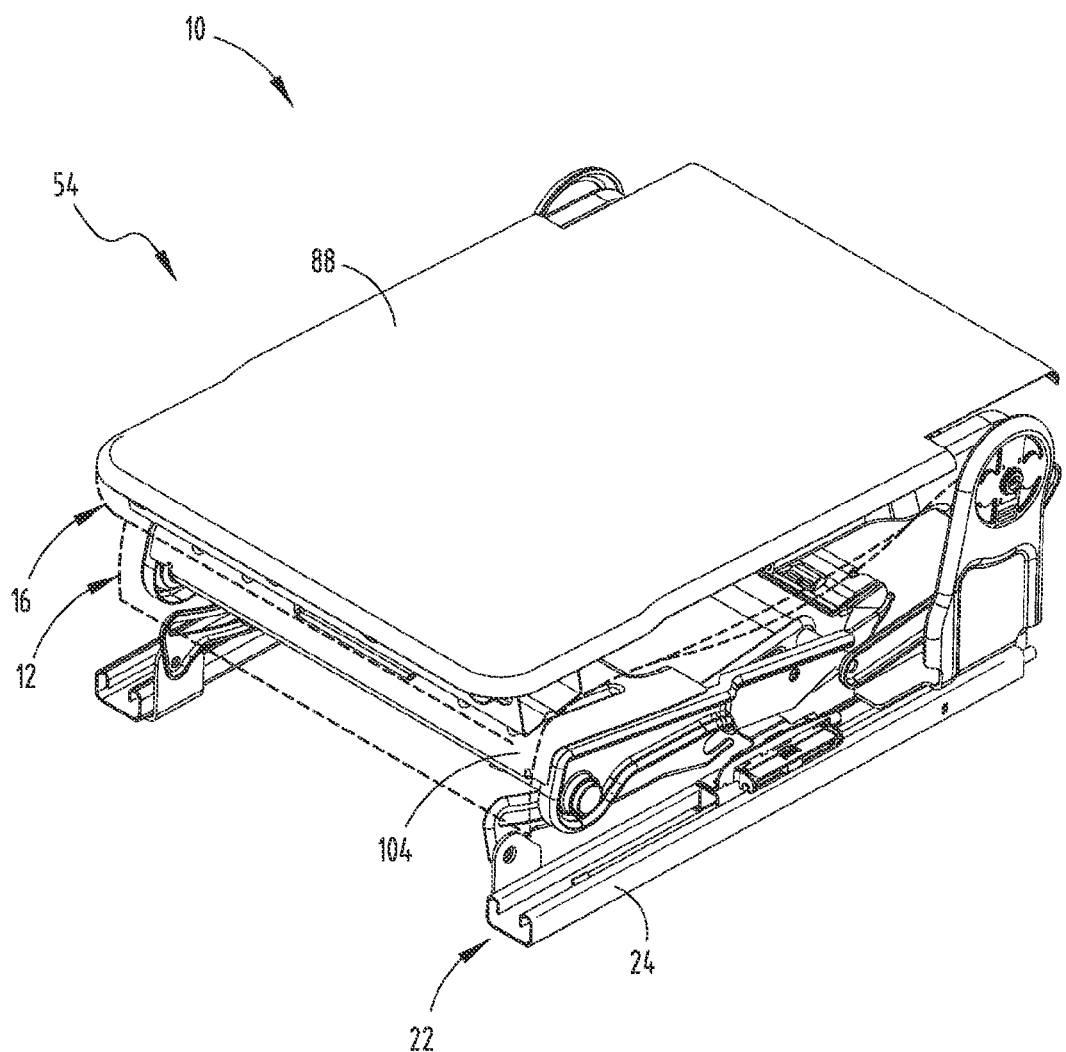
FIG. 10 is a top perspective view of a vehicle seating assembly in the stowed position.

As further illustrated in FIG. 10, when the vehicle seating assembly 10 is in the stowed position 54, a planar extent of the seatback 16 is generally parallel with the rail 24 of the track assembly 22. As such, the rear panel 88 of the seatback 16 may be used within the vehicle 62 (FIG. 1) as a substantially level storage surface. In addition, in the stowed position 54, the seat 12 and the seat pan 104 are collapsed to a closer proximity, relative to the deployed position 52 (FIG. 7), with the track assembly 22 and the floor 66 of the vehicle 62 (FIG. 1).

From the stowed position 54, as shown in FIGS. 9 and 10, the vehicle seating assembly 10 may elevate to the deployed position 52 (FIG. 7) by transitioning through a reverse series of the steps as described above and illustrated in FIGS. 7-10. The reverse series of steps includes lifting the top edge 96 (FIG. 2) of the seatback 16 in the rearward direction, causing the seatback 16 to pivot about the recliner pivot 78 (FIG. 9), and causing the tab 20 (FIG. 9) to rotate about the recliner pivot 78 and move clockwise in the forward direction. Accordingly, the transitional step from the stowed position 54 to the deployed position 52 is substantially identical to the transitional step illustrated in FIG. 8. Upon engaging the vehicle seating assembly 10 in the deployed position 52 (FIG. 7), the vehicle seating assembly 10 will again assume the characteristics for such position, as described in detail above.

Figure 11:
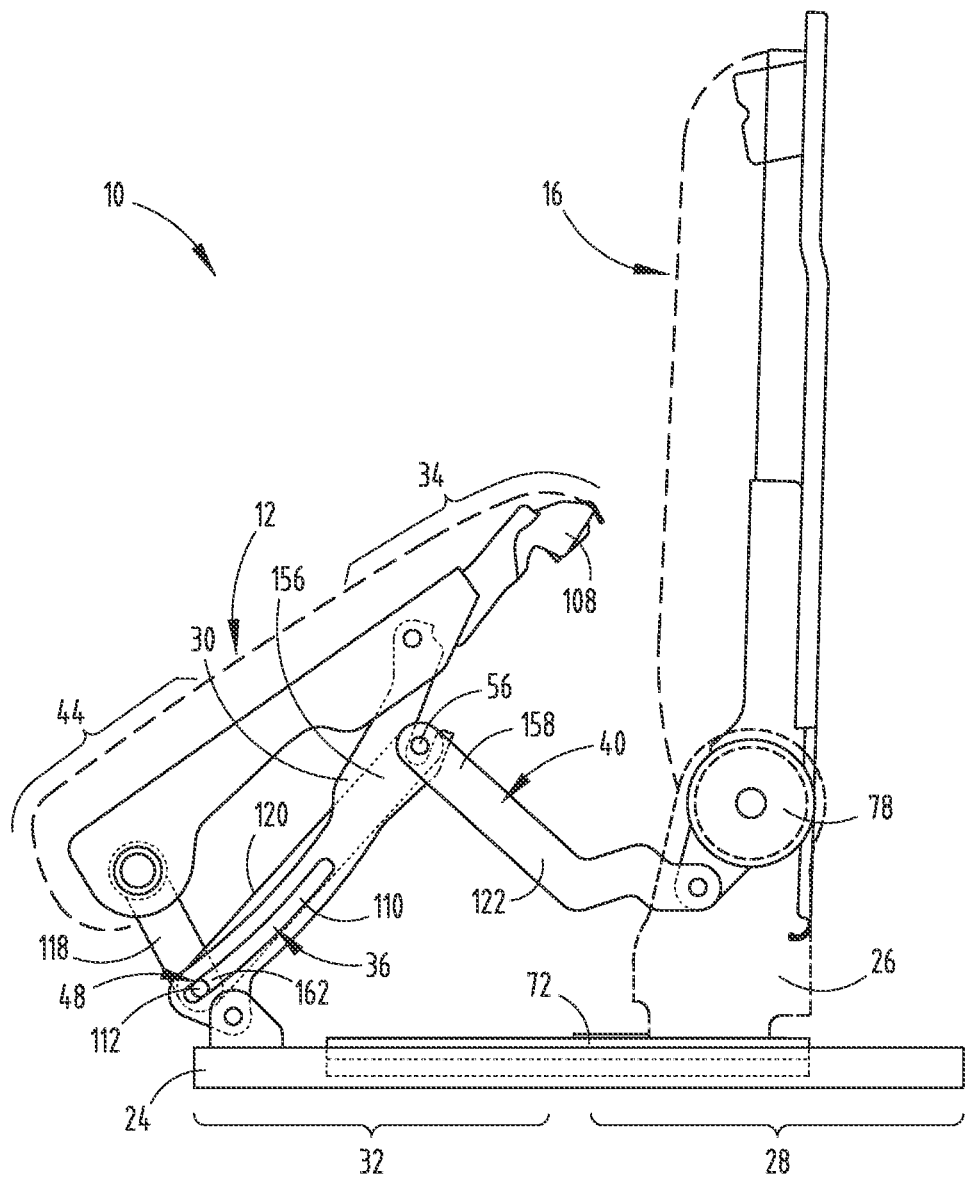
FIG. 11 is a side elevational view of a vehicle seating assembly transitioning between the deployed position and an access position.
Figure 12:
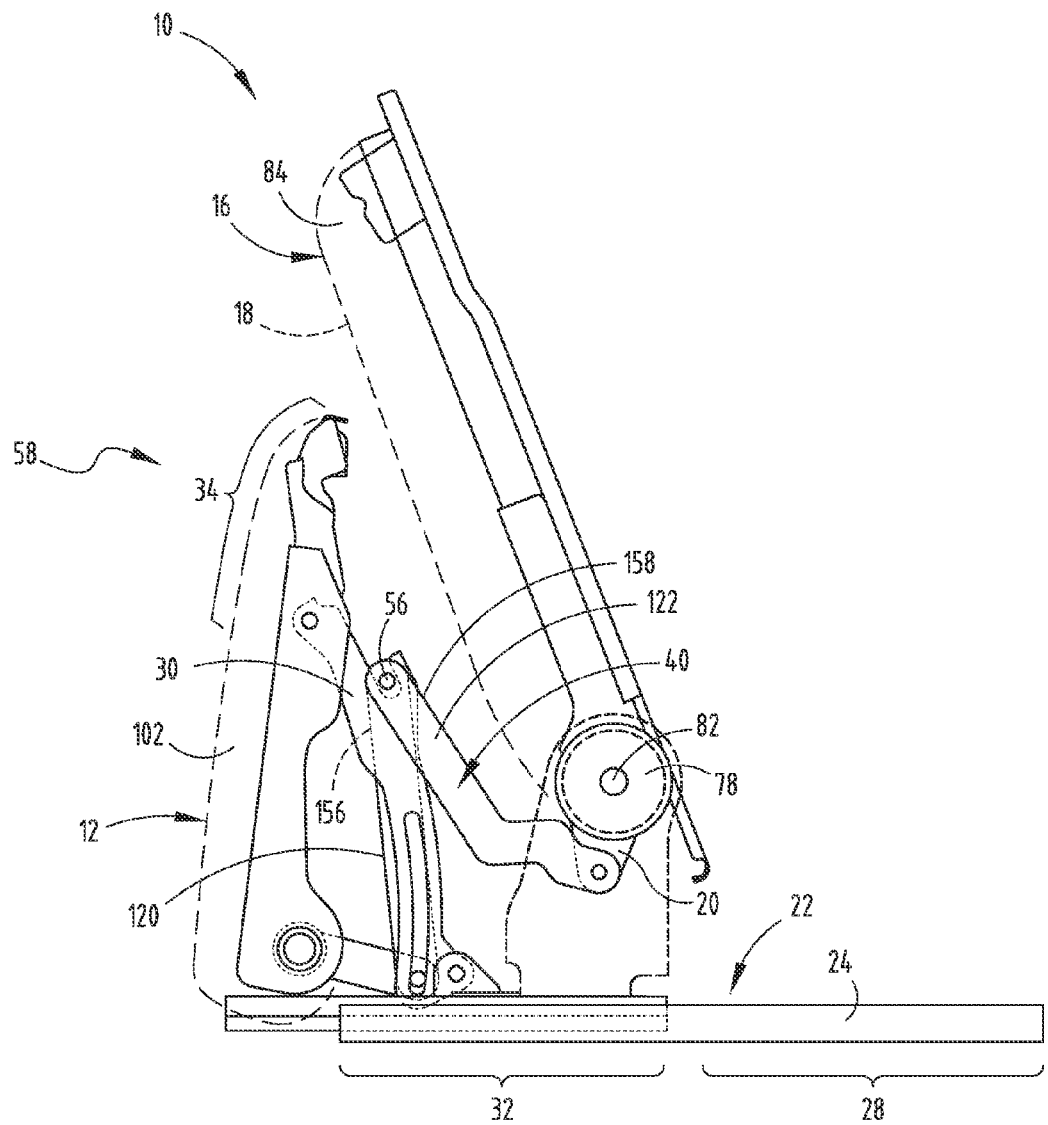
FIG. 12 is a side elevational view of a vehicle seating assembly in the access position.

Referring now to FIG. 11, the vehicle seating assembly 10 is transitioning between the deployed position 52 (FIG. 7) and the access position 58 (FIG. 12). During the transition to the access position 58, the seatback 16 begins to pivot forward slightly about the recliner pivot 78 and the base member 26 supporting the seatback 16 begins to slide forward on the rail 24 toward the forward segment 32 of the rail 24. Due to the fixed pivotable connection of the bracket 30 with the forward segment 32 of the rail 24, the forward sliding motion of the seatback 16 causes the hinge 56 in the linkage 40 to begin to rotate and raise the second end 156 of the intermediate link 120 and the front end 158 of the rear link 122. The movement of the hinge 56 pushes the bracket 30 forward and causes the rear portion 34 of the seat 12 to disengage with the base member 26 and rise above the front portion 44 of the seat 12. Accordingly, the hook 108 on the rear portion 34 of the seat 12 disengages with the protuberance on the base member 26. The protrusion 112 of the coupler 48 remains in the forward portion 162 of the elongated slot 110 of the articulation feature 36, and accordingly the front link 118 remains stationary relative to the bracket 30 and the seat 12. As the slider 72 of the base member 26 continues to slide forward on the rail 24, the hinge 56 continues to rotate and pivot the rear portion 34 of the seat 12 up and forward. Alternatively, the rear portion 34 of the seat 12 may be lifted to rotate the hinge 56 in the linkage 40 and cause the seatback 16 to begin to slide forward on the rail 24.

As shown in FIG. 12, the vehicle seating assembly 10 is illustrated in the access position 58. In the access position 58, the planar extent of the seat 12 is generally orthogonal relative to the track assembly 22 and the seatback 16 has slid forward to the forward segment 32 of the rail 24. Accordingly, the slider 72 of the base member 26 that pivotally supports the seatback 16 has slid to the forward segment 32 of the rail 24. Upon sliding the seatback 16 to the forward segment 32 of the rail 24, the hinge 56 in the linkage 40 rotates and raises the second end 156 of the intermediate link 120 and the front end 158 of the rear link 122, such that the intermediate link 120 is generally vertical and orthogonal relative to the rail 24 of the track assembly 22. Further, the movement of the hinge 56 rotates the bracket 30 forward, and accordingly rotates the rear portion 34 of the seat 12, such that the seat 12 is generally vertical. The seatback 16 is rotated forward slightly, such that the tab 20 is positioned below the torsion bar 82 of the recliner pivot 78. In the access position 58, the back support surface 18 is orientated in close proximity to the vertically orientated seat 12. It is contemplated that in the access position 58, the rear portion 34 of the seat 12 may abut the back support surface 18 of the seatback 16. It is also contemplated that using a thicker or thinner seat cushion 102 or back cushion 84 may result in the orientation of the seat 12 and the seatback 16 being altered slightly from the orientations described above.

Figure 13:
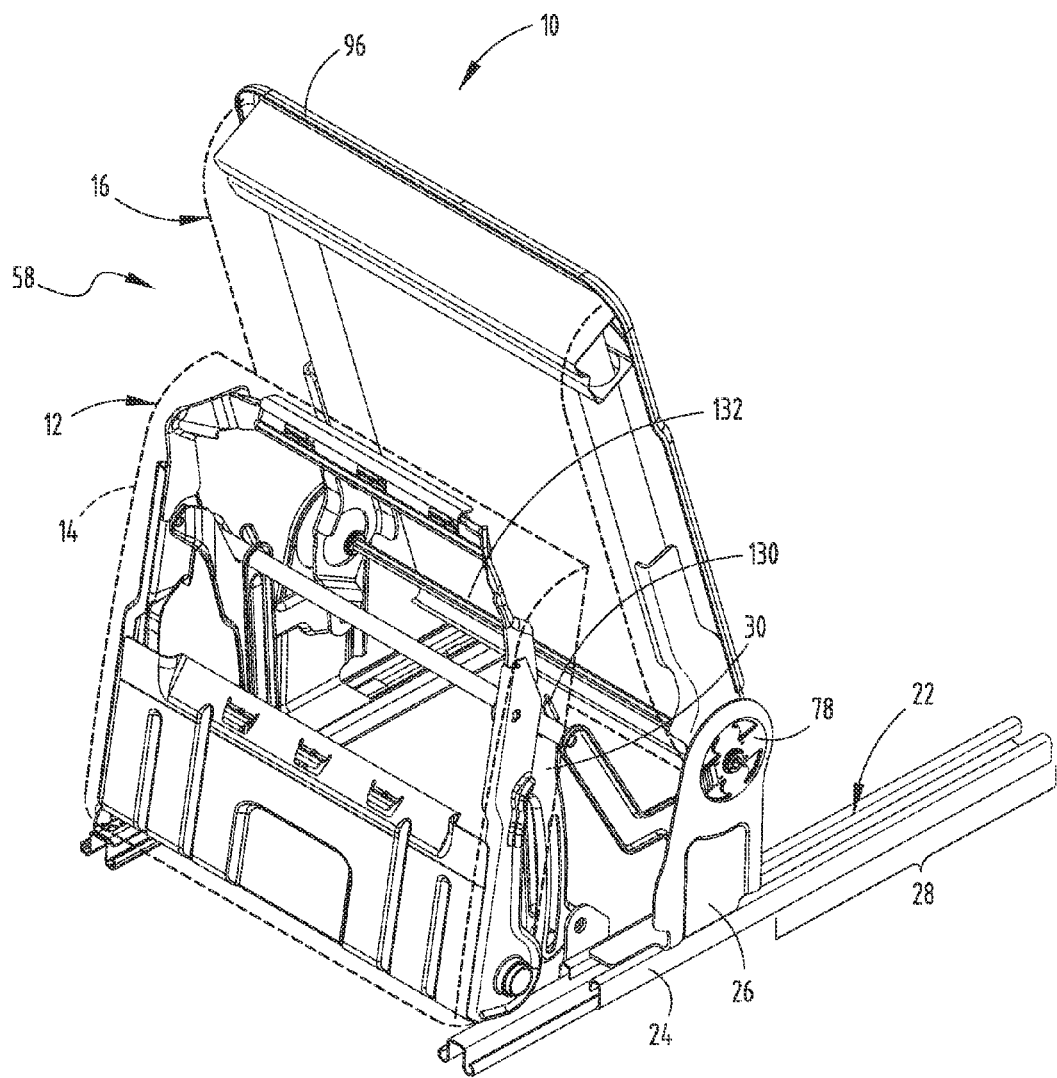
FIG. 13 is a top perspective view of a vehicle seating assembly in the access position.

As further illustrated in FIG. 13, when the vehicle seating assembly 10 is in the access position 58, the sitting surface 14 of the seat 12 faces forward and a planar extent of the seat 12 is generally orthogonal with the rail 24 of the track assembly 22. Further, the seatback 16 is slid forward on the rail 24 to a close proximity with the generally vertically orientated seat 12, such that the rearward segment 28 of the rail 24 is not occupied by the seat 12 or the seatback 16. The area provided above the rearward segment 28 of the rail 24 by the vehicle seating assembly 10 in the access position 58 allows an occupant to more easily access a rear seat location behind the vehicle seating assembly 10 or use the area for additional storage capacity.

From the access position 58, as shown in FIGS. 12 and 13, the vehicle seating assembly 10 may reposition to the deployed position 52 (FIG. 7) by transitioning through a reverse series of the steps as described above and illustrated in FIGS. 7, 11, and 12. The reverse series of steps includes pulling the top edge 96 (FIG. 2) of the seatback 16 in the rearward direction, causing the seatback 16 to pivot about the recliner pivot 78 (FIG. 9), and causing the base member 26 to slide along the rail 24 to the rearward segment 28 of the rail 24. As the seatback 16 is slid to a rearward segment 28 of the rail 24, the rear engagement rod 132 pulls the fork 130 on the bracket 30 to pivot the rear portion 34 of the seat 12 down from the generally vertical orientation in the access position 58 to the generally horizontal orientation in the deployed position 52 (FIG. 7). As such, the hinge 56 engages the bracket 30 when the vehicle seating assembly 10 transitions from the access position 58 to the deployed position 52. With respect to other orientations and configurations of elements of the vehicle seating assembly 10, the transitional step from the access position 58 to the deployed position 52 is generally identical to the transitional step illustrated in FIG. 11. Upon engaging the vehicle seating assembly 10 in the deployed position 52, the vehicle seating assembly 10 will again assume the characteristics for such position, as illustrated and described in detail above.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seating assembly comprising:
   a track assembly including a rail and a base member slidably engaged with the rail and supporting a seatback;
   a bracket having a forward end pivotally coupled to the rail, a rearward end coupled to a seat, and an articulation feature therebetween supporting the seat; and
   a linkage coupling the seat with the seatback, comprising:
   a coupler engaged with the articulation feature, wherein movement of the coupler relative to the articulation feature translates the seating assembly between a deployed position, having the seat generally orthogonal to the seatback and a stowed position having the seatback abutting the seat and generally parallel to the rail; and
   a hinge in the linkage that is pivotal to cause translation from the deployed position to an access position having the seat generally orthogonal to the rail and the seatback slid to a forward segment of the rail.

2. The vehicle seating assembly of claim 1, wherein the seatback is pivotally coupled with the base member, and wherein the seatback has a forward extending tab that is coupled with the linkage, such that forward pivotal movement of the seatback from the deployed position causes the tab to move rearward and the coupler to move relative to the articulation feature.

3. The vehicle seating assembly of claim 1, wherein the articulation feature of the bracket includes an elongated slot disposed at a mid-portion thereof, and wherein the coupler of the linkage includes a protrusion disposed at an intermediate portion thereof, such that the protrusion is slidably engaged with the elongated slot.

4. The vehicle seating assembly of claim 1, wherein the hinge in the linkage includes a laterally extending rod that engages a fork on the bracket when the seating assembly is in the deployed and access positions, such that when the seatback is slid to a rearward segment of the rail, the rod pulls the fork to adjust the seat from a generally vertical orientation in the access position to a generally horizontal orientation in the deployed position.

5. The vehicle seating assembly of claim 1, wherein the linkage includes a front link pivotally coupled with a front portion of the seat, a rear link pivotally coupled with a forward extending tab of the seatback, and an intermediate link that includes the coupler, which is engaged with the articulation feature.

6. The vehicle seating assembly of claim 1, wherein the seatback includes a recliner pivot that pivotally couples the seatback with the base member and is configured to lock the angle of a planar extent of the seatback relative to a planar extent of the seat.

7. A vehicle seating assembly comprising:
a seatback slidably engaged with a rail;
a bracket coupled to the rail and supporting a seat; and
a linkage coupling the seat with the seatback, comprising:
an intermediate portion defining a protrusion slidably engaged with a slot on the bracket to cause translation of the seating assembly between a deployed position having the seat generally parallel to the rail and a stowed position having the seatback generally parallel to the rail; and
a hinge in the linkage that is pivotal to cause translation from the deployed position to an access position having the seat generally orthogonal to the rail, wherein the hinge engages the bracket when the seating assembly transitions from the access position to the deployed position, such that the hinge pulls the bracket to pivot the seat rearward about the rail.

8. The vehicle seating assembly of claim 7, wherein the bracket is pivotally coupled to a forward segment of the rail, and wherein the seatback includes a base member slidably engaged with a rearward segment of a rail, such that the seatback slides to the forward segment of the rail when the seating assembly is in the access position.

9. The vehicle seating assembly of claim 7, wherein the seatback includes a back support surface, and wherein the seat includes a sitting surface, such that the back support surface abuts the sitting surface when the seating assembly is in the stowed position.

10. The vehicle seating assembly of claim 7, wherein a planar extent of the seat is generally orthogonal to a planar extent of the seatback when the seating assembly is in the deployed position.

11. A vehicle seating assembly comprising:
a bracket coupled to a rail, supporting a seat, and having an articulation feature;
an intermediate link slidably coupled to the articulation feature to translate the seating assembly between deployed and stowed positions; and
a hinge having a lateral rod rotatably and releasably engaged with the bracket, the bracket being rearwardly rotatable relative thereto to adjust the seat from a generally vertical orientation to a generally horizontal orientation.

12. The vehicle seating assembly of claim 11, wherein the seating assembly in the deployed position is further defined by the seat orientated generally orthogonal to the seatback, and wherein the seating assembly in the stowed position is further defined by the seatback abutting the seat and orientated generally parallel to the rail.

13. The vehicle seating assembly of claim 11, wherein the seating assembly in the deployed position is further defined by the seatback positioned at a rearward segment of the rail, and wherein the seating assembly in the access position is further defined by the seat orientated generally orthogonal to the rail and the seatback slid to a forward segment of the rail.

14. The vehicle seating assembly of claim 11, further comprising:
a base member slidably engaged with the rail and pivotally supporting the seatback.

15. The vehicle seating assembly of claim 11, wherein the bracket is pivotally coupled with the rail for pivotal movement of the seat from the deployed position, wherein the seat has a generally horizontal orientation, to the access position, wherein the seat has a generally vertical orientation.

16. The vehicle seating assembly of claim 11, wherein the seatback has a forward extending tab that is coupled with the linkage, such that movement of the seating assembly between the deployed position and the stowed position causes the forward extending tab to move the coupler relative to the articulation feature.

17. The vehicle seating assembly of claim 1, wherein the hinge engages the bracket, such that the hinge pulls the bracket to pivot the seat rearward about the rail when the seating assembly moves from the access position to the deployed position.

18. The vehicle seating assembly of claim 7, wherein the bracket engages a laterally extending rod when the seating assembly moves from the access to the deployed position.

* * * * *